United States Patent
Sengupta et al.

(10) Patent No.: US 12,493,788 B2
(45) Date of Patent: Dec. 9, 2025

(54) GENERATING KNOWLEDGE GRAPHS FROM CONVERSATIONAL DATA

(71) Applicant: Accenture Global Solutions Limited, Dublin (IE)

(72) Inventors: Shubhashis Sengupta, Bangalore (IN); Anutosh Maitra, Bangalore (IN); Roshni Ramesh Ramnani, Bangalore (IN); Zishan Ahmad, Patna (IN); Pushpak Bhattacharyya, Bihta (IN); Asif Ekbal, Patna (IN)

(73) Assignee: Accenture Global Solutions Limited, Dublin (IE)

( * ) Notice: Subject to any disclaimer, the term of this patent is extended or adjusted under 35 U.S.C. 154(b) by 983 days.

(21) Appl. No.: 17/313,555

(22) Filed: May 6, 2021

(65) Prior Publication Data

US 2022/0156582 A1    May 19, 2022

(30) Foreign Application Priority Data

Nov. 13, 2020   (IN) .............................. 202041049720

(51) Int. Cl.
G06N 3/08     (2023.01)
G06N 3/045    (2023.01)
G06N 5/02     (2023.01)

(52) U.S. Cl.
CPC ............... G06N 3/08 (2013.01); G06N 3/045 (2023.01); G06N 5/02 (2013.01)

(58) Field of Classification Search
CPC ............. G06N 5/02; G06N 3/045; G06N 3/08
See application file for complete search history.

(56) References Cited

U.S. PATENT DOCUMENTS

| | | | |
|---|---|---|---|
| 10,678,816 B2 | 6/2020 | Peng et al. | |
| 11,475,310 B1 * | 10/2022 | Teig | ..................... G06N 3/084 |
| 2004/0059564 A1 * | 3/2004 | Zhou | ................... G06F 16/3338 |
| | | | 704/4 |
| 2007/0073533 A1 * | 3/2007 | Thione | .................... G06F 40/35 |
| | | | 704/9 |

(Continued)

OTHER PUBLICATIONS

Zhou et al., "Pre-trained Contextualized Representation for Chinese Conversation Topic Classification," 2019, In 2019 IEEE International Conference on Intelligence and Security Informatics (ISI), pp. 122-127, doi.org/10.1109/ISI.2019.8823172 (Year: 2019).*

(Continued)

*Primary Examiner* — Michael J Huntley
*Assistant Examiner* — Vincent Anton Spraul
(74) *Attorney, Agent, or Firm* — Seed Intellectual Property Law Group LLP

(57) ABSTRACT

Techniques for building knowledge graphs from conversational data are disclosed. The systems include a high-performance relation classifier developed with active learning and requiring minimal supervision. The classifier is used to classify relation triples extracted from conversational text, which are then used to populate the knowledge graph. A heuristic for constructing the knowledge graph is also disclosed. The proposed embodiments provide a way to efficiently build and/or augment knowledge graphs and improve the quality of the generated responses by a dialogue agent despite a sparsity of data.

17 Claims, 11 Drawing Sheets

(56) References Cited

U.S. PATENT DOCUMENTS

| | | | | |
|---|---|---|---|---|
| 2016/0062980 | A1* | 3/2016 | Boguraev | G06N 5/04 |
| | | | | 706/11 |
| 2017/0024375 | A1 | 1/2017 | Hakkani-Tur et al. | |
| 2017/0288940 | A1* | 10/2017 | Lagos | H04L 41/0266 |
| 2019/0317994 | A1* | 10/2019 | Singh | G06F 40/30 |
| 2020/0133962 | A1* | 4/2020 | Kuo | G06F 40/30 |
| 2021/0349925 | A1* | 11/2021 | Panineerkandy | G06F 16/3344 |
| 2023/0367977 | A1* | 11/2023 | Nagata | G06N 3/088 |

OTHER PUBLICATIONS

Elhammadi et al., "A High Precision Pipeline for Financial Knowledge Graph Construction," 2020, Proceedings of the 28th International Conference on Computational Linguistics, pp. 967-977 (Year: 2020).*

Wu et al., "Enriching Pre-trained Language Model with Entity Information for Relation Classification," 2019, arXiv:1905.08284v1 (Year: 2019).*

Z. Ahmad et al., "Active Learning Based Relation Classification for Knowledge Graph Construction from Conversation Data", ICONIP 2020, Bangkok Thailand, Nov. 18-22, 2020, Proceedings, Part IV ; https://www.researchgate.net/publication/347039594_Active_Learning_Based_Relation_Classification_for_Knowledge_Graph_Construction_from_Conversation_Data.

Agichtein, E., Gravano, L.: Snowball: Extracting relations from large plain-text collections. In: Proceedings of the fifth ACM conference on Digital libraries. pp. 85-94 (2000).

Angeli, G., Premkumar, M.J.J., Manning, C.D.: Leveraging linguistic structure for open domain information extraction. In: Proceedings of the 53rd Annual Meeting of the Association for Computational Linguistics and the 7th International Joint Conference on Natural Language Processing (vol. 1: Long Papers). pp. 344-354 (2015).

Bao, J., Duan, N., Yan, Z., Zhou, M., Zhao, T.: Constraint-based question answering with knowledge graph. In: Proceedings of COLING 2016, the 26th International Conference on Computational Linguistics: Technical Papers. pp. 2503-2514 (2016).

Bollacker, K., Evans, C., Paritosh, P., Sturge, T., Taylor, J.: Freebase: a collaboratively created graph database for structuring human knowledge. In: Proceedings of the 2008 ACM SIGMOD international conference on Management of data. pp. 1247-1250 (2008).

Bordes, A., Gabrilovich, E.: Constructing and mining web-scale knowledge graphs: Kdd 2014 tutorial. In: Proceedings of the 20th ACM SIGKDD international conference on Knowledge discovery and data mining. pp. 1967-1967 (2014).

Devlin, J., Chang, M.W., Lee, K., Toutanova, K.: Bert: Pre-training of deep bidirectional transformers for language understanding. arXiv preprint arXiv:1810.04805 (2018).

Dong, X., Gabrilovich, E., Heitz, G., Horn, W., Lao, N., Murphy, K., Strohmann, T., Sun, S., Zhang, W.: Knowledge vault: A web-scale approach to probabilistic knowledge fusion. In: Proceedings of the 20th ACM SIGKDD international conference on Knowledge discovery and data mining. pp. 601-610 (2014).

Graupmann, J., Schenkel, R., Weikum, G.: The SphereSearch engine for unified ranked retrieval of heterogeneous XML and Web documents. In: Proceedings of the 31st international conference on Very large data bases. pp. 529-540. VLDB Endowment (2005).

Guo, Q., Zhuang, F., Qin, C., Zhu, H., Xie, X., Xiong, H., He, Q.: A survey on knowledge graph-based recommender systems. arXiv preprint arXiv:2003.00911 (2020).

Hixon, B., Clark, P., Hajishirzi, H.: Learning knowledge graphs for question answering through conversational dialog. In: Proceedings of the 2015 Conference of the North American Chapter of the Association for Computational Linguistics: Human Language Technologies. pp. 851-861 (2015).

Koncel-Kedziorski, R., Bekal, D., Luan, Y., Lapata, M., Hajishirzi, H.: Text generation from knowledge graphs with graph transformers. arXiv preprint arXiv:1904.02342 (2019).

Lehmann, J., Isele, R., Jakob, M., Jentzsch, A., Kontokostas, D., Mendes, P.N., Hellmann, S., Morsey, M., Van Kleef, P., Auer, S., et al.: DBpedia—a large-scale, multilingual knowledge base extracted from wikipedia. Semantic Web 6(2), 167-195 (2015).

Lenat, D.B.: CYC: A large-scale investment in knowledge infrastructure. Communications of the ACM 38(11), 33-38 (1995).

Lin, H., Yan, J., Qu, M., Ren, X.: Learning dual retrieval module for semisupervised relation extraction. In: The World Wide Web Conference. pp. 1073-1083 (2019).

Mitchell, T., Cohen, W., Hruschka, E., Talukdar, P., Yang, B., Betteridge, J., Carlson, A., Dalvi, B., Gardner, M., Kisiel, B., et al.: Never-ending learning. Communications of the ACM 61(5), 103-115 (2018).

Nakashole, N., Theobald, M., Weikum, G.: Scalable knowledge harvesting with high precision and high recall. In: Proceedings of the fourth ACM international conference on Web search and data mining. pp. 227-236 (2011).

Ng, V., Cardie, C.: Improving machine learning approaches to coreference resolution. In: Proceedings of the 40th annual meeting on association for computational linguistics. pp. 104-111. Association for Computational Linguistics (2002).

Peng, C.: A bert based relation classfication network for interpersonal relationship extraction. CCKS2019-shared task (2019).

Shi, P., Lin, J.: Simple BERT models for relation extraction and semantic role labeling. arXiv preprint arXiv:1904.05255 (2019).

Suchanek, F.M., Kasneci, G., Weikum, G.: YAGO: a core of semantic knowledge unifying Wordnet and Wikipedia. In: Proceedings of the 16th international conference on World Wide Web. pp. 697-706 (2007).

Turki, H., Shafee, T., Taieb, M.A.H., Aouicha, M.B., Vrandečić, D., Das, D.,Hamdi, H.: Wikidata: A large-scale collaborative ontological medical database. Journal of biomedical informatics 99, 103292 (2019).

Vu, T., Nguyen, T.D., Nguyen, D.Q., Phung, D., et al.: A capsule network-based embedding model for knowledge graph completion and search personalization. In:Proceedings of the 2019 Conference of the North American Chapter of the Association for Computational Linguistics: Human Language Technologies, vol. 1 (Long and Short Papers). pp. 2180-2189 (2019).

Wang, L., Cao, Z., De Melo, G., Liu, Z.: Relation classification via multi-level attention CNNs. In: Proceedings of the 54th Annual Meeting of the Association for Computational Linguistics (vol. 1: Long Papers). pp. 1298-1307 (2016).

Zaveri, A., Rula, A., Maurino, A., Pietrobon, R., Lehmann, J., Auer, S., Hitzler, P.: Quality assessment methodologies for linked open data. Submitted to Semantic Web Journal 15, 16 (2013).

Zeng, D., Liu, K., Lai, S., Zhou, G., Zhao, J., et al.: Relation classification via convolutional deep neural network (2014).

Zhou, P., Shi, W., Tian, J., Qi, Z., Li, B., Hao, H., Xu, B.: Attention-based bidirectional long short-term memory networks for relation classification. In: Proceedings of the 54th annual meeting of the association for computational linguistics (vol. 2: Short papers). pp. 207-212 (2016).

* cited by examiner

Algorithm 1 Knowledge Graph Heuristic

1: procedure KG_BUILD(conversation)
2:     Initialize KG
3:     SRL ← Semantic Role Labeller
4:     C ← Pre-trained Relation Classifier
5:     for utterance in conversation do
6:         split utterance into sentences
7:         for sentence in sentences do
8:             O/E ← Get all the OpenIE triples from the sentence
9:             C_Trip ← C(O/E)
10:            Add the C_Trip triples to the corresponding KG slot
11:            SRL_Sent ← SRL(sentence)
12:            if negation exists in SRL_Sent then
13:                 Arg ← Negated Argument
14:                 Remove all triples from KG containing Arg
15:     return KG     ▷ Final Knowledge Graph of the conversation

FIG. 5

GENERATING KNOWLEDGE GRAPHS FROM CONVERSATIONAL DATA

CROSS-REFERENCE TO RELATED APPLICATIONS

This application claims the benefit of India Provisional Patent Application Number 202041049720, filed Nov. 13, 2020, and titled "Generating Knowledge Graphs from Conversational Data," which is incorporated by reference herein in its entirety.

TECHNICAL FIELD

The present disclosure generally relates to the generation of conversation graphs. More specifically, the present disclosure generally relates to a system and method for processing the utterances in conversations associated with a specific task and representing the resultant knowledge in the form of a conversation graph.

BACKGROUND

Natural language understanding systems interpret the word sequences of user utterances. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks (also referred to herein as "goals" or "intents") include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user. However, the available systems are not able to effectively access or make use of the wealth of knowledge that may be provided by the speech content and strategies and/or solutions that were identified in previous conversations for similar tasks.

There is a need in the art for a system and method that addresses the shortcomings discussed above.

SUMMARY

In the context of this disclosure, a system for building knowledge graphs from conversational data can include a high-performing model for relation classification. The model is specially configured to apply active learning techniques to solve the challenge of extracting relation triples from conversational text. The trained classifier and heuristic method offer substantially improved accuracy and coverage scores for domain specific conversational datasets or fixed ontology conversational domains. In one example, a Bidirectional Encoder Representations from Transformers (BERT)-based relation classifier is disclosed that is trained using a customized active learning technique that can classify relationships between entities with minimal supervision. The accuracy and completeness of the knowledge graph generated by the BERT classifier is improved as negated extracted relations are removed from the knowledge graphs when the relationships change throughout a conversation.

In one aspect, the disclosure provides a computer implemented method of relation classification for generating knowledge graphs. The method includes a first step of extracting a first relation triple from conversational data and a second step of marking each entity in the first relation triple with unused tokens to produce an enriched sentence. A third step includes tokenizing the enriched sentence with one or more tokens, and a fourth step includes assigning token indices to each of the one or more tokens to produce an indexed sentence. The method also includes a fifth step of extracting a representation of a classification token (CLS) from the indexed sentence, and a sixth step of classifying the enriched sentence into at least a first relation class. The method further includes a seventh step of populating a knowledge graph with the first relation triple based on the classification of the enriched sentence.

In yet another aspect, the disclosure provides a non-transitory computer readable medium storing software that may comprise instructions executable by one or more computers which, upon execution, cause the one or more computers to: (1) extract a first relation triple from conversational data; (2) mark each entity in the first relation triple with unused tokens to produce an enriched sentence; (3) tokenize the enriched sentence with one or more tokens; (4) assign token indices to each of the one or more tokens to produce an indexed sentence; (5) extract a representation of a classification token (CLS) from the indexed sentence; (6) classify the enriched sentence into at least a first relation class; and (7) populate a knowledge graph with the first relation triple based on the classification of the enriched sentence.

In yet another aspect, the disclosure provides a system for generating a response to a query, the system comprising one or more computers and one or more storage devices storing instructions that may be operable, when executed by the one or more computers, to cause the one or more computers to: (1) extract a first relation triple from conversational data; (2) mark each entity in the first relation triple with unused tokens to produce an enriched sentence; (3) tokenize the enriched sentence with one or more tokens; (4) assign token indices to each of the one or more tokens to produce an indexed sentence; (5) extract a representation of a classification token (CLS) from the indexed sentence; (6) classify the enriched sentence into at least a first relation class; and (7) populate a knowledge graph with the first relation triple based on the classification of the enriched sentence.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is an example of a heuristic for building a knowledge graph, according to an embodiment;

DESCRIPTION OF EMBODIMENTS

Figure 1:
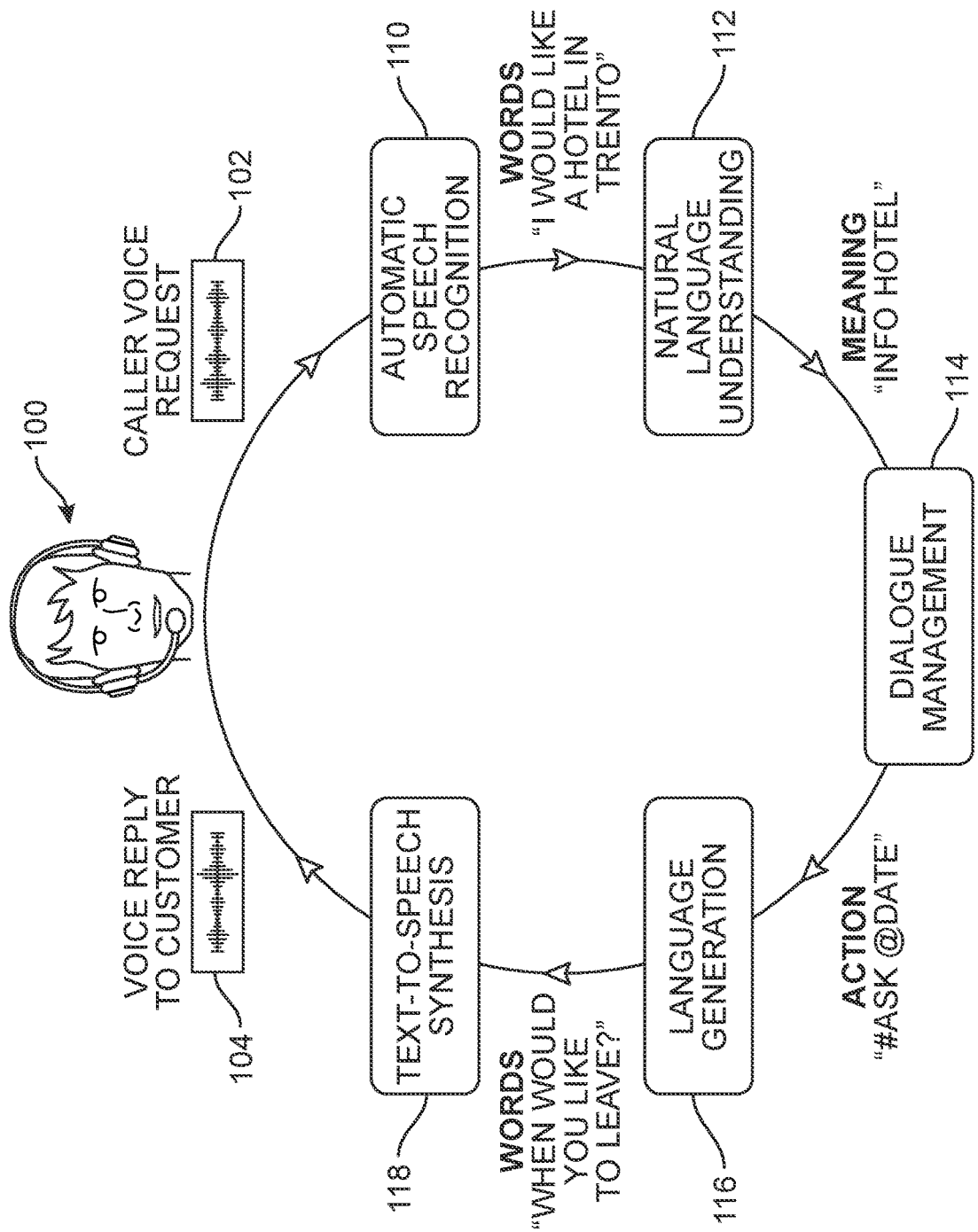
FIG. 1 is a schematic diagram of an overview of an embodiment of a dynamic chatbot system.

Conversation systems such as those providing virtual chatbots are being increasingly relied on by businesses and organizations to increase customer engagement and provide support. In order to bolster these automated virtual agents, it is important to offer more reliable and robust data resources for the virtual agents to rely on as they attempt to generate meaningful dialogues with customers that can promote successful outcomes. Toward this end, a great deal of information may be collected from past chat logs or conversations that can be used to improve future conversations. However, to ensure such information is useful and usable, the information must be organized and accessible in a format that is defined and recognizable, allowing the knowledge to be readily applicable to different scenarios. For example, a knowledge graph may be constructed to provide the structure and representation of information that is desired.

As a general matter, a knowledge graph ("KG") can refer to a representation that captures the salient knowledge about a particular task. A knowledge graph is a structured representation of facts, consisting of entities, relationships and semantic descriptions. Entities can be real-world objects and abstract concepts, relationships represent the relation between entities, and semantic descriptions of entities and their relationships contain types and properties with a well-defined meaning. The knowledge graph includes an array of interconnected nodes and each connection represents a relationship with its own properties or attributes. As will be discussed below, in some embodiments, a portion of the knowledge graph that includes group of nodes can be isolated or extracted, where each node represents various properties, objects, subjects, and constraints, in order to respond to a specific query. In many cases, knowledge graphs can store and convey in a single network a large collection of information. As some examples, a knowledge graph encodes the domain entities, relationships, processes, and polices for a given business or organization. A generic semantic natural language processing engine can then be applied to user queries and retrieve the correct results from the knowledge graph.

The generation of a KG from text has remained a complex and challenging task, typically requiring multiple natural language processing (NLP) modules working together in unison. The task becomes even more challenging when constructing a knowledge graph from conversational data, as user and agent statements in conversations are often not grounded and can change (e.g., become negated) with subsequent dialogue turns. As will be discussed below, KG construction from conversational data can be improved by implementation of a relation classifier. For example, applying active learning techniques, a BERT-based relation classifier is proposed that requires minimal data, yet offers accurate classification of relation triples extracted from conversational data. In addition, heuristics for constructing KGs that uses the BERT relation classifier as well as Semantic Role Labelling (SRL) techniques for handling negations in extracted relationship triples will be presented. The trained classifier and heuristic method offer substantially improved accuracy and coverage scores for domain specific conversational datasets or fixed ontology conversational domains. Furthermore, the proposed embodiments provide a mechanism by which to efficiently augment KGs and improve the quality of the generated responses by a dialogue agent despite a sparsity of data. In some embodiments, the proposed techniques can be used to automatically process past conversations and identify the intents of that conversation, generate the entity-relation triple that should be mapped to the identified intent, create a knowledge graph based on these conversations, and continue to seamlessly integrate new information into and/or replace obsolete information in the knowledge graph as new conversational data is provided.

When a knowledge graph is generated based on conversations, the general intent or task associated with previous conversations between a customer and an agent can be determined and used to separate different groups or collections of conversations. The utterances by the user and agent in each conversation within a group may be isolated as individual word sequences. The chatbot can then serve a more dynamic role, as will be described herein. In such knowledge graphs, each node in the graph can represent the collection of similar word sequences or utterances (e.g., utterances directed toward the same resolution and/or providing similar information) by different agent instances or customers across different conversations. Based on these classifications, the system can be configured to generate and present a conversation graph comprising a plurality of these nodes. In addition, the nodes will be connected to other nodes by an "edge" line, also referred to herein as a transitional path or transitional edge. For example, a first node will be connected to a second node by a transitional path. The transitional path represents one or more instances where a particular utterance associated with the first node was followed by a particular utterance associated with the second node in a conversation, thereby depicting a dialogue sequence corresponding to a portion of the conversation. Thus, the conversation graphs can convey in a single illustration a large collection of utterances from a set of conversations about a similar topic as well as the subsequent utterances that were provided in the conversation sequence, as well as the frequency with which such sequences occurred.

As provided in greater detail below, the proposed embodiments offer a technique for building a knowledge graph from conversational data. As a general overview, this process involves the creation of a high-performance relation classifier using active learning and minimal supervision. This classifier is used to classify relation triples extracted from conversation text, in order to populate the knowledge graph ontology of the dataset. A knowledge graph construction heuristic is then developed that makes use of the trained classifier and SRL (semantic role labeling) module. Initial experiments conducted using this technique show that a high performing classifier can be built using (for example) only 700 training samples through active learning. The knowledge graphs built using the heuristics disclosed have also exhibited high accuracy scores that validate the performance of the classifier.

As noted earlier, some or all of the information represented by the knowledge graph can be based on datasets corresponding to conversational systems where users and agents or machines interact, providing a rich source of deriving real life and situational knowledge. The knowledge graphs derived and validated from conversational episodes in domains like customer support provide useful information on customer choices, preferences, and other related information that can be used to serve customers better. However, it may be appreciated that building knowledge graphs from conversational data can be challenging, as the beliefs in conversational data are not grounded and can change rapidly with dialogue turns, and the relation between entities can be implicit in nature.

The proposed techniques disclosed for construction of knowledge graphs that address these and other challenges can be understood to include the following general process: (a) begin with a basic (seed) ontology or "metagraph"; (b) apply relational triple extraction, classification, and occlusion methods to extract relevant entities and relationships for conversations; and (c) apply heuristics for adding and/or modifying (e.g., for negation) the extracted Entities instances and Relationship instances in the ontology. Thus, given a conversation between a user and an agent, the proposed techniques can be used to reliably extract entity-relation triples, classify and/or map the triples with specific ontological relation types, and then construct a knowledge graph (or a portion thereof) for that conversation. In some embodiments, a knowledge graph is created based on a first set of past conversation records, and is then augmented over time as new conversations are received and processed. In other words, embodiments of the proposed mechanisms can be utilized to create a "knowledge corpus" in a specific form, accessing past conversations in order to support future similar or related conversations, thereby enabling runtime dialogue management.

In some embodiments, a particular methodology of creation and augmentation of a knowledge graph from conversational data will be used. A first example method includes a first step of applying an algorithm for the classification of relations of triples extracted (using, for example, OpenIE, or other algorithms for extracting SVO (Subject-Verb-Object) triples) into ontological relation types, followed by a second step of applying a relation classification using entropy based active learning with minimal supervision. This method can also be referred to as relationship classification, and serves the specific purpose of generating and providing the system with the ability to respond appropriately when there are goal shifts during a conversation. For example, it is possible that two entities may be connected through multiple relationships and a different relationship may be leveraged for conversing with a changed goal. The relationship classification itself is based on an active learning approach to enable training with minimum supervision.

A second example method includes a first step of applying an algorithm for the classification of intents that may be present in a conversation or dialogue. It should be understood that multiple intents may be identified in a single utterance, and the disclosed algorithm is capable of doing so in a substantially simultaneous process. This is followed by a second step of using an intent classifier to extract the correct entity, with respect to the intent. Relation triples are identified after extracting such entities that are related to the intent(s) that were identified. These relation triples can then be subject to the first method above that classifies the identified relation triples. A heuristic-based algorithm is used to insert the information into (append) the knowledge graph. This method can also be referred to as intent classification, and serves the purpose of identifying entities with respect to the specific intent of that particular conversation. This helps identifying the section on the knowledge graph to be traversed for proceeding with the conversation.

In some embodiments, both methods are utilized to construct or augment the knowledge graph. In one example, knowledge graph construction occurs by first applying the second method (intent classifier) to a conversation. This process identifies the intent(s) of the conversation, as well as specific object triples and entities that correspond to those particular intent(s). This output can then be provided as input to the first method (relation classifier) in order to classify and extract the relationship between the relation phrases and the relation types. This process can occur with minimal supervision.

The systems and methods disclosed herein offer significant improvements to current chatbots. Automated chatbot systems can provide users with access to information and/or cause actions to be performed regarding one or more queries. The proposed systems and methods are configured to manage conversations in real-time with human customers based on a dynamic and unscripted conversation flow with a virtual assistant. In one embodiment, a knowledge graph or domain model represents the sole or primary source of information for the virtual assistant, thereby removing the reliance on any form of conversational modelling (e.g., to define entities and intents, or capturing states or conditions, etc.). Based on the information provided by the knowledge graph, the virtual agent chatbot will be equipped to answer customer queries, as well as demonstrate reasoning, offering customers a more natural and efficacious dialogue experience. In some embodiments, the chatbot will be able to learn from the customer and make meaningful recommendations with reference only to the information supplied by the ever-evolving knowledge graphs. By providing chatbots with a larger context based on past chat logs or conversations, future conversations about similar topics can be improved.

In different embodiments, an automated chatbot service may allow users to apply for a loan, submit travel requests or baggage claims, and a wide range of other goals that can eliminate the necessity of a human agent and expedite resolutions for the customer. Data from multiple sources may be retrieved and used to generate a response to a user in the context of a chatbot service. The chatbot makes use of an artificial intelligence stack to perform functions of ever-increasing complexity: from simpler active and reinforcement learning, to more complex comprehension tasks and question answering. The type of AI employed can include deep learning, machine learning, case-based reasoning, dialogue strategies and knowledge graphs, as well as advanced active speech recognition and natural language understanding.

As an example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a natural language understanding system 112. For example, some core natural language understanding services may include dialogue act classification, intent classification, slot identification, and non-sentential utterances (NSU). In another example, such services may include coreference resolution, chat language and emoticon, spelling correction, and sentiment and emotion analysis and/or may further include a template-based natural language generation module.

The goal of natural language understanding system 112 is to extract the meaning of the string of words passed on from speech recognition system 110. For example, natural language understanding system 112 may analyze the phrase "I would like a hotel in Trento" and determine that the customer is looking for information about a hotel. More specifically, in some embodiments, the natural language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of natural language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence. The goal of dialogue management system 114 is to track the current state of the dialogue between virtual agent 100 and the customer and to respond to the request in a conversational manner. Dialogue management system 114 generates an action based on the information received from natural language understanding system 112, as well as the state of the dialogue with the customer. The dialogue management system 114 may include a mechanism for receiving inputs and displaying outputs to a user. For example, this mechanism may include speech recognition for inputting audio speech from a user and a text-to-speech capability for providing the user with a speech output and/or a user message/system response for inputting text from a user and providing output to a user in text.

In different embodiments, the dialogue management system 114 may include a dialogue manager that manages interactions with a user. The dialogue manager including a task-dialogue manager that may be in communication with all of the elements within the natural language understanding system. Furthermore, the dialogue manager may include a backend including a task graph and a knowledge graph. These elements may each communicate with the task dialogue manager. The knowledge graph can be created using the methods described herein. In other words, in different embodiments, the dialogue management system 114 is configured to retrieve information stored in or mapped by a knowledge graph that includes data and decisions relevant to the topics being discussed. Thus, the virtual agent 100 needs only rely on data mapped in a knowledge graph to supply appropriate responses to a user's query. This represents a powerful shift away from conventional conversational modeling techniques that require repeated training sessions based on user utterances, and tethers such utterances to a template of possible responses. Such conventional approaches are highly scripted, and if a user strays from the approved templates, the system will be stymied.

In contrast, the proposed embodiments allow for the creation of a knowledge graph that will support multiple tasks and intents. The knowledge graph can be leveraged to identify the actions occurring in a conversation and facilitate subsequent template driven dialogue generation by enabling runtime dialogue management. For example, the proposed systems offer a conversational AI bot that can map free-form factoids, process-oriented requests, and logical queries to a knowledge graph to generate reliable responses that can encompass a wide range of unscripted dialogue (e.g., dialogue for which there has been no previous training). Implementation of a knowledge graph-based conversation system is a powerful mechanism by which a knowledge graph can be used to support and facilitate in semantic parsing, storage of information (e.g., facts about the domain), and creation of natural language text. The knowledge graph in the proposed embodiments thus serves a far more intelligent and resourceful role than conventional systems that make more limited use of knowledge graphs as only a type of primitive information repository or executing intent matching techniques. Furthermore, the code format offered by the proposed systems is reusable and easy for a domain designer to implement and maintain. For example, in a conversation between a user and a call center agent (e.g., a travel agency), the system could automatically extract entities and relationships from each utterance or piece of dialogue, and a final knowledge graph of these relationships could be constructed by the end of the conversation. This knowledge graph would represent the final user requirements (e.g., travel booking details, etc.), and used by the virtual agent for subsequent queries to satisfy these requirements automatically (e.g., queries for tickets and bookings, etc.).

Thus, the dialogue management system 114 can readily retrieve the appropriate action for the given task, context, and input by reference to a knowledge graph generated using the processes disclosed herein. In some cases, the action immediately output by dialogue management system 114 may be symbolic in nature (e.g., "#ask @date"). This symbolic output is then converted into a natural language response by a language generation system 116. For example, language generation system 116 may receive input from dialogue management system 114 (e.g., "#ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met. During each cycle, the virtual agent 100 will continue to make reference to the knowledge graph to respond to and advance the conversation.

Thus, it may be appreciated that a virtual agent may rely on a variety of subsystems and modules to achieve the goal of conversing with a customer and responding to the customer goals. Such communication may occur through various modes, including text-based chat programs that may run on a desktop, laptop or mobile device, telephone calls, audio and/or video calls transmitted over the internet (e.g., through services such as Skype) as well as other known modes of communication. In order for the virtual agent to provide the most appropriate and accurate responses, the source of information of such responses should be both comprehensive and allow for clear pathways to the relevant data.

As noted above, in recent years KGs have become increasingly common across a variety of applications such as recommendation systems, web searches, question-answering. Knowledge graphs from conversational data can have various practical applications. For example, it has been shown that KG based systems help in generating more coherent multi-sentence text. Using KGs for generating responses in conversations can also potentially help in grounding the conversation and increasing its coherency. For example, in a conversation between a user and a call center agent (e.g., a Travel Agency), the system could be configured to extract entities and relationships at each turn, and a final KG of these relations could be constructed by the end of the conversation. This final KG represents the final user requirements (e.g., Travel Booking details, etc.) and queries could be executed to satisfy these requirements automatically (e.g., a query for ticket bookings, etc.) in subsequent interactions.

However, most high-quality knowledge graphs (e.g., Wikidata) are built by volunteers through crowd-sourcing, and automated systems for building KGs from textual data are not yet prevalent. In addition, building KGs from conversational data present a very different set of challenges relative to those derived from fact-based text. For example, unlike factual data, the beliefs in conversational data are not grounded. For example, "Toronto is in Canada" is a factual text, and a triple "is in(Toronto, Canada)" can be extracted from it. More text supporting this fact can readily be found, thus increasing the confidence-weight in the belief.

In contrast, in conversational datasets, beliefs can change over a series of conversations, or even in the same conversation. For purposes of illustration, a fragment of conversational data is presented below. The relation between the entities, "trip" and "Atlantis" is "destination(trip, Atlantis)" per the first CUSTOMER utterance. However, this relation changes to "destination(trip, Neverland)" by the time the second CUSTOMER utterance occurs.

CUSTOMER: I'd like to book a trip to Atlantis from Caprica.
AGENT: Hi . . . I checked a few options for you, and unfortunately, we do not currently have any trips that meet this criteria.
CUSTOMER: Okay, I'd like to go to Neverland.

From the above example, it can be seen that the relation triple extracted from the second CUSTOMER utterance is between trip and Neverland. However, there is no mention of the word trip in the second utterance. Thus, in conversational data, implicit entities and relations can be present, making the task difficult. Another challenge in constructing KGs from conversations is that, because the facts are not grounded, standard methods using confidence-weights cannot be used for better triple extraction.

In different embodiments, the proposed system relies on a base domain ontology or conversational dataset and then uses facts and relations extracted from the conversations to augment the knowledge graph. As a general matter, organizing information into structured knowledge bases requires information extraction (IE) of entities and knowledge of the relationships between them. Once a KG ontology for a given dataset is built, active learning techniques are used to train a BERT-based classifier for classifying relationships between the entities using minimal-supervision. These entities and their relationships are then used to build a heuristic for KG construction from conversational data. The proposed embodiments are configured to process and analyze conversations and automatically construct and/or augment a KG to reflect the most up-to-date information that has been collected. For example, referring to the example conversational text below:

user: Hi, me and my family want to take a trip to Kakariko Village.
agent: How many adults and how many children will you be bringing with you? Do you have a preferred departure location? What would be your maximum budget?
user: We are four adults and 11 children departing from Godric's Hollow. $3500 is the most we are willing to spend.
agent: I do not have any packages available from that departure location for that budget.

user: I would not be able to spend more than $4500
agent: Would you like to suggest another departure location?
user: We'll catch a flight from Toronto then. We're headed for Kakariko Village.
agent: There are no travel packages available to Kakariko Village.
user: Ok, do you have any travel packages to Kingston, Canada for 11 kids and 4 adults, $3500 or less, departing from Toronto?
agent: Yes, I have a package available leaving Toronto on August 24th and return-ing to Toronto on August 30th.
user: Yes, I'll take it. Thank you.

it can be seen that the user changes their responses for the "Source_City", "Destination_City", as well as the budget. As will be described herein, the proposed embodiments offer a system capable of identifying each of these changes and accommodating the changes in the final KG that is constructed so that only the final correct request(s) is stored.

Further details regarding this process are discussed now with reference to the remaining figures. FIGS. 2-5 present embodiments of a method for active learning, relation classification, and KG construction. Given a conversation between a user and an agent, the task is to extract entity-relation triples, classify the triple relation to ontological relation types, and then construct a KG for the conversation.

For the purposes of testing some of the proposed embodiments two different datasets: (i) Microsoft® Frames and (ii) Microsoft® e2e taxi booking datasets were used. The Frames corpus consists of goal-oriented dialogues between the users who need to book a trip and assistants who search a database to find the appropriate trips. The e2e corpus was collected through Amazon Mechanical Turk, and consists of a set of goal-oriented dialogues between the user and an agent regarding taxi booking. More details about the two datasets are depicted in Table 1 below.

TABLE 1

| Dataset | Total Dialogues | Total Dialogue Turns | Average Turns per Dialogue |
| --- | --- | --- | --- |
| MS Frames | 1,369 | 19,986 | 15 |
| MS e2e taxi booking Frames | 3,094 | 23,312 | 7 |

Both of these datasets are related to reservation and booking services. For example, the Microsoft® Frames dataset is based on the travel domain while the Microsoft® e2e dataset is based on the taxi booking domain. As these datasets are completely un-annotated, a seed training dataset was prepared by manually labelling the relations, followed by implementation of an active learning method to populate the training set.

Initially, in order to build the knowledge graph from conversations, the entities, relations and entity-relation triples from the utterances of the dialogue are extracted. In this case, Open Information Extraction (OpenIE) suite was used for this purpose, though in other embodiments, different extraction tools such as but not limited to AllenNLP, AI2, Spacy, ClauseIE, and Plasticity may be used. Generally, OpenIE extracts propositions from a sentence, comprising a relation phrase and two or more argument phrases. The relation phrases thus extracted using OpenIE must then be classified into the relation types belonging to the KG ontology. Thus, extracting triples from OpenIE and classifying them into the corresponding relation types (with respect to the KG of the dataset) enables a means of populating the KG with the appropriate entity-relationship triples.

In some embodiments, a BERT-based model is used to classify the relation triples extracted by OpenIE into the ontological relation types. To achieve this, the input to the BERT model is prepared by enriching the statement or, more generally, the sentence or utterance from which the OpenIE triple is extracted with the extracted triple. Such a process is necessary because the triple alone does not always provide sufficient information for relation classification. An example of sentence/statement enrichment is presented with reference to FIG. 2. Where a statement 210 "I need to go to Denver Airport" is obtained, OpenIE will extract the following triple 220: "{'subject': 'I', 'relation': 'go to', 'object': 'Denver Airport'}". An enriched statement 230 can be generated by marking the entities present in the triple with BERT unused tokens in the sentence "<tok1>I</tok1> need to go to <tok2>Denver Airport</tok2>".

Figure 2:
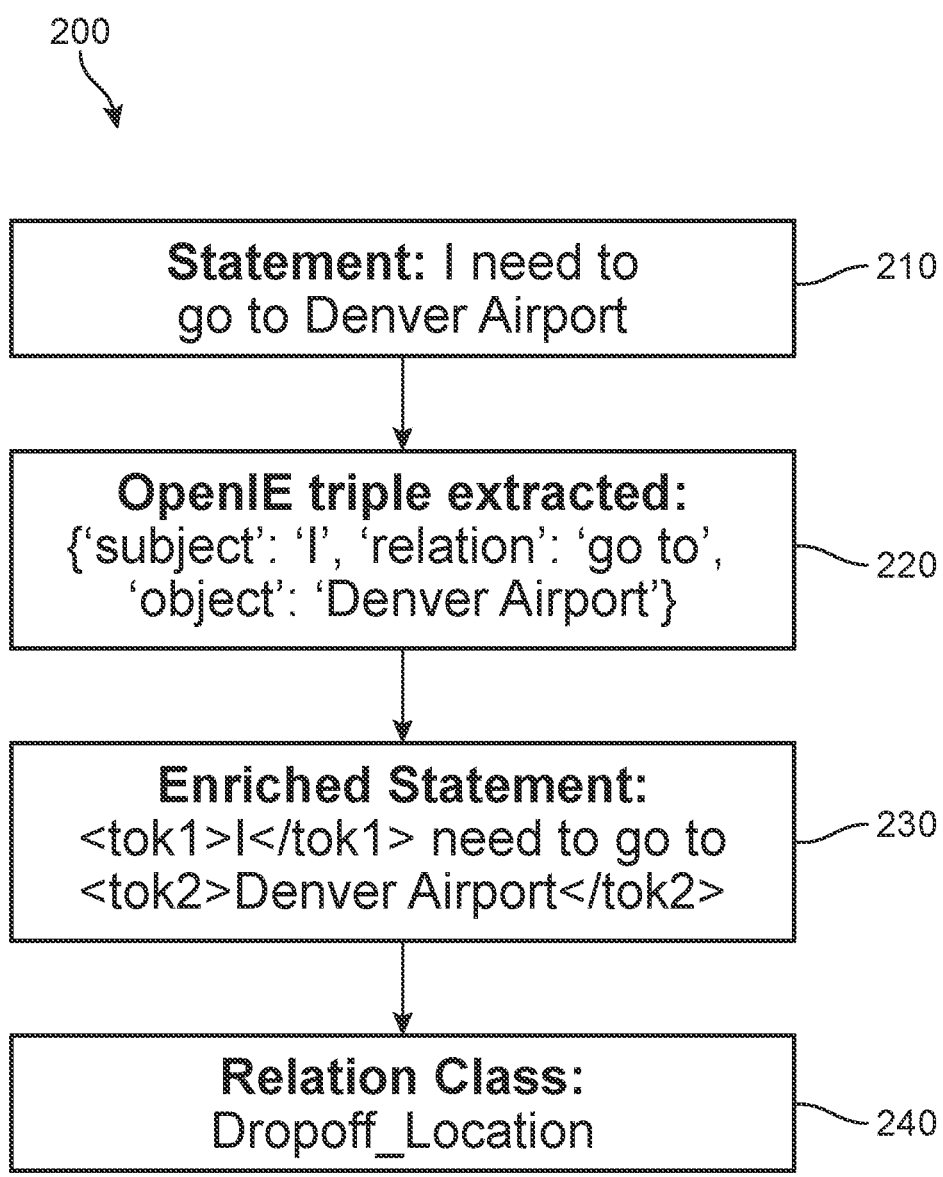
FIG. 2 is an example of statement enrichment, according to an embodiment.
Figure 3:
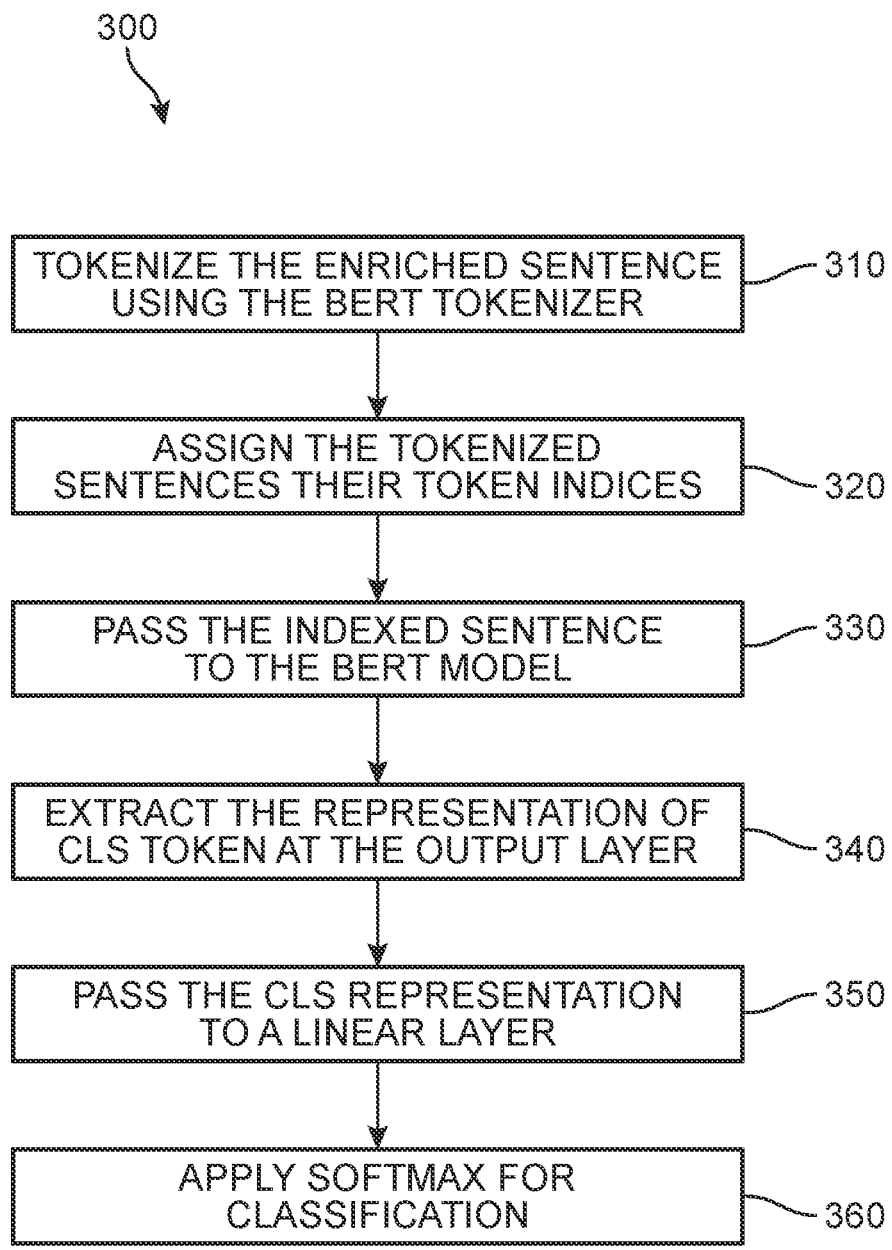
FIG. 3 is a flow chart presenting an example of a relation triple classification algorithm, according to an embodiment.

In different embodiments, the enriched statement 230 thus obtained can be further processed for classification, as shown with reference to relation classifier diagram 300 of FIG. 3. In a first step 310, the enriched sentence or statement is tokenized using the BERT tokenizer. In a second step 320, the tokenized sentences are assigned their token indices. The indexed sentence is passed to the BERT encoder model in a third step 330. At the final layer of BERT, the representation corresponding to the classification token (CLS) is extracted in a fourth step 340, and passed through a linear layer in a fifth step 350. Finally, softmax is applied in order to classify the enriched statement into different relation classes in a sixth step 360. In this case, the enriched statement is assigned a Relation Class 240 of "Dropoff_Location", as shown in FIG. 2.

It may be appreciated that because the two datasets used were not annotated, the BERT classifier was also trained using active learning and minimal supervision. More specifically, OpenIE was run on the entire dataset, extracting the relation triples from all of the dialogue utterances. In this example, a seed dataset of 300 instances (relation triples and their corresponding utterances) was sampled for the relation classification task. The ground truth (i.e., test set) was prepared by manually annotating a set of 300 samples to evaluate the performance of the classifier.

Figure 4:
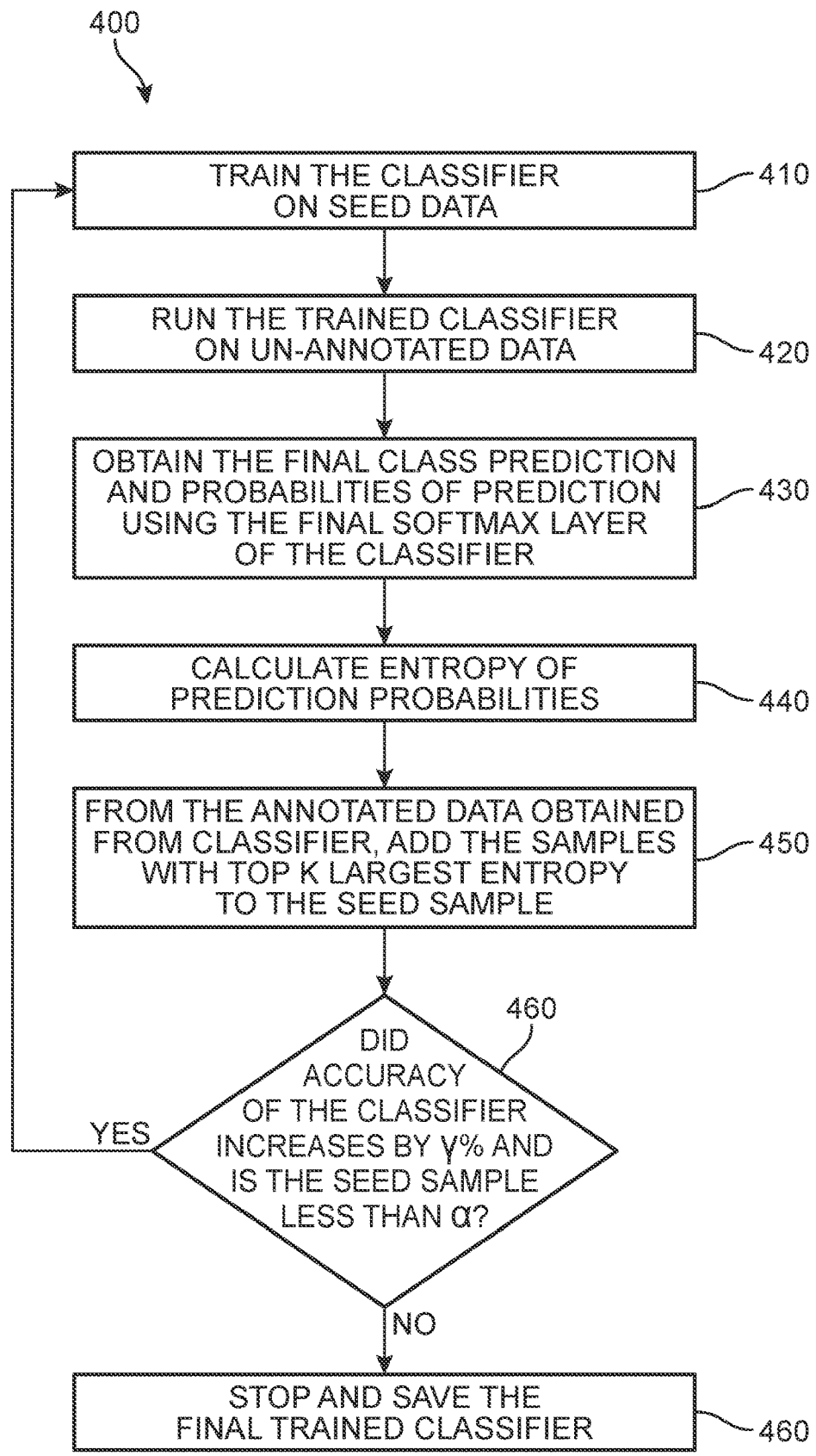
FIG. 4 is a flow chart presenting an example of a training process for a relation triple classification algorithm, according to an embodiment.

Referring to FIG. 4, a training process 400 for the classifier involves a first step 410 of training the classifier on seed data, and a second step 420 of running the trained classifier on un-annotated data. In a third step 430, the final class prediction and probabilities of prediction using the final softmax layer of the classifier are obtained. The entropy of prediction probabilities is calculated in a fourth step 440. In one embodiment, the entropy is calculated using the following formula:

$$H(X) = -\sum_{i=1}^{n} p_i \log_2 p_i$$

Where H(X) is the entropy with respect to the input X, n is the number of classes, and $p_i$ is the probability of prediction of the i-th class.

This is followed by a fifth step 450 in which samples with the largest entropy (top k) in the annotated data obtained from classifier are added to the seed sample. If accuracy of the classifier increases by γ% and the seed sample is less than a (see sixth step 460), the process will return to first step 410. Otherwise, the process is stopped and the final trained classifier is saved in a seventh step 470. In this example, γ% is fixed to 1, and a to 700 samples. Using the aforementioned active learning steps, a high performing relation classifier using minimum supervision is built. The relations annotated in each dataset and their class distribution after the final step of active learning are shown in Table 2 below.

TABLE 2

| Microsoft Frames Relation Class | Number of Samples | Microsoft e2e taxi booking Relation Class | Number of Samples |
|---|---|---|---|
| Source_City | 148 | Pickup_Location | 112 |
| Destination_City | 131 | Dropoff_Location | 110 |
| Trip_Start_Date | 102 | Pickup_Time | 74 |
| Trip_End_Date | 81 | Car_Type | 115 |
| Number_of_People | 77 | Number_of_People | 120 |
| Budget | 101 | Budget | 13 |
| Other | 360 | Customer_Name | 75 |
|  |  | Other | 381 |

Using OpenIE, propositions and relation phrase triples are extracted from each statement in the two conversational datasets. These relation phrases are classified to relation types according to the data ontology. However, to populate the KG, the extracted triples cannot be placed within the KG based solely on their relation types, as the extracted relations can be negated and/or updated as the conversations between the user and agent proceed. For this reason, Semantic Role Labelling (SRL) is applied to detect the negated verbs and their corresponding arguments. The relations in KG that have entities matching any chunk in the negated argument of SRL are detected, and then removed from the KG. When a relation is found in the conversation for which the KG had already been populated (based on the previous utterances), the previous (old) triple is replaced with the new triple. In such cases, there is an assumption that the user has changed his/her requirements for booking. An example heuristic 500 for KG construction is shown in FIG. 5.

Experiments for relation classification and KG construction were conducted to test embodiments of the proposed methods using the two datasets. The classifier was trained for relation classification using the active learning steps discussed above. For purposes of this testing, the BERT based model was trained using the following settings: (i) Number of attention heads: 12, (ii) Number of hidden layers: 12, (iii) Number of neurons at output layer: 6 (for MS Frames classifier) and 7 (for MS e2e classifier), (iv) Learning Rate: $5 \times 10^{-5}$, (v) Initial weights in BERT: weights of BERT-base-uncased model, (vi) Loss function: Cross-entropy loss. In addition, for active learning experiments, the following parameters applied: Number of seed samples: 300; γ: 1%; α: 700 samples; k: 200 for the 1st iteration, and 100 for the 2nd and 3rd iterations.

Detailed evaluation results of the two classifiers in terms of recall (R), precision (P), and F1-score (F) are shown in Table 3 below.

TABLE 3

| Microsoft Frames Classifier | | | | Microsoft e2e Classifier | | | |
|---|---|---|---|---|---|---|---|
| Class | P | R | F | Class | P | R | F |
| Source_City | 0.88 | 0.90 | 0.89 | Pickup_Location | 0.80 | 0.61 | 0.69 |
| Destination_City | 0.85 | 0.90 | 0.88 | Dropoff_Location | 0.74 | 0.89 | 0.81 |
| Trip_Start_Date | 0.78 | 0.68 | 0.72 | Pickup_Time | 0.89 | 0.89 | 0.89 |
| Trip_End_Date | 0.83 | 0.74 | 0.79 | Car_Type | 0.69 | 0.76 | 0.72 |
| Number_of_People | 0.81 | 0.79 | 0.80 | Number_of_People | 0.95 | 0.91 | 0.93 |
| Budget | 0.78 | 0.80 | 0.89 | Budget | 1.0 | 0.75 | 0.86 |
| Other | 0.83 | 0.76 | 0.80 | Customer_Name | 0.90 | 0.94 | 0.92 |
|  |  |  |  | Other | 0.83 | 0.84 | 0.84 |

It may be observed that the classifier achieves a considerable performance increase for all of the classes with a very minimal number of samples (in this case, 700 samples). For the MS Frames dataset, the best performance is obtained for the class Source_City, while the class Trip_Start_Date obtains the lowest scores. In addition, the classifier for the MS e2e dataset yields the highest performance for the Number_of_People class, while showing the lowest performance for the Pickup_Location.

In different embodiments, once the classifier has been trained and acceptable classification scores have been obtained, the KG may be constructed. In one example, the KG is constructed using the heuristic presented in FIG. 5 or portions thereof. The results obtained are measured in terms of 'Correctness' and 'Completeness', where correctness refers to the percentage of correctly identified triples in the conversation and completeness refers to the percentage of triples extracted out of the total actual triples in the conversations. In order to compute these values, 50 conversations were randomly selected, and the system was run on each of these conversations. The KG constructed using this approach was then compared against the KG constructed manually from the conversations. The results thus obtained for each of the datasets are shown in Table 4 below.

TABLE 4

| Dataset | Correctness | Completeness |
|---|---|---|
| Microsoft Frames | 64% | 56% |
| Microsoft e2e | 71% | 40% |

While moderately high results in terms of correctness were obtained, the system scored lower in terms of completeness. It can be appreciated that the correctness score is heavily affected by negations. Because the SRL often missed the negation, or is unable to associate negation with the negated triples, the system retains triples in the KG that should have been removed, thereby increasing false positives. In addition, the completeness of the system is affected because of the inaccurate relation triple extraction by the OpenIE system, which can miss triples in conversation and leave the KG incomplete.

As noted earlier, the proposed embodiments also offer an alternate or additional approach to creating relation triples by the use of a specially trained algorithm for the classification of intents. The intent classifier is used to extract the correct entity, with respect to the intent, and relation triples are created after extracting such entities. It should be understood that multiple intents may be identified in a single utterance, and the disclosed algorithm is capable of doing so in a substantially simultaneous process.

Figure 6:
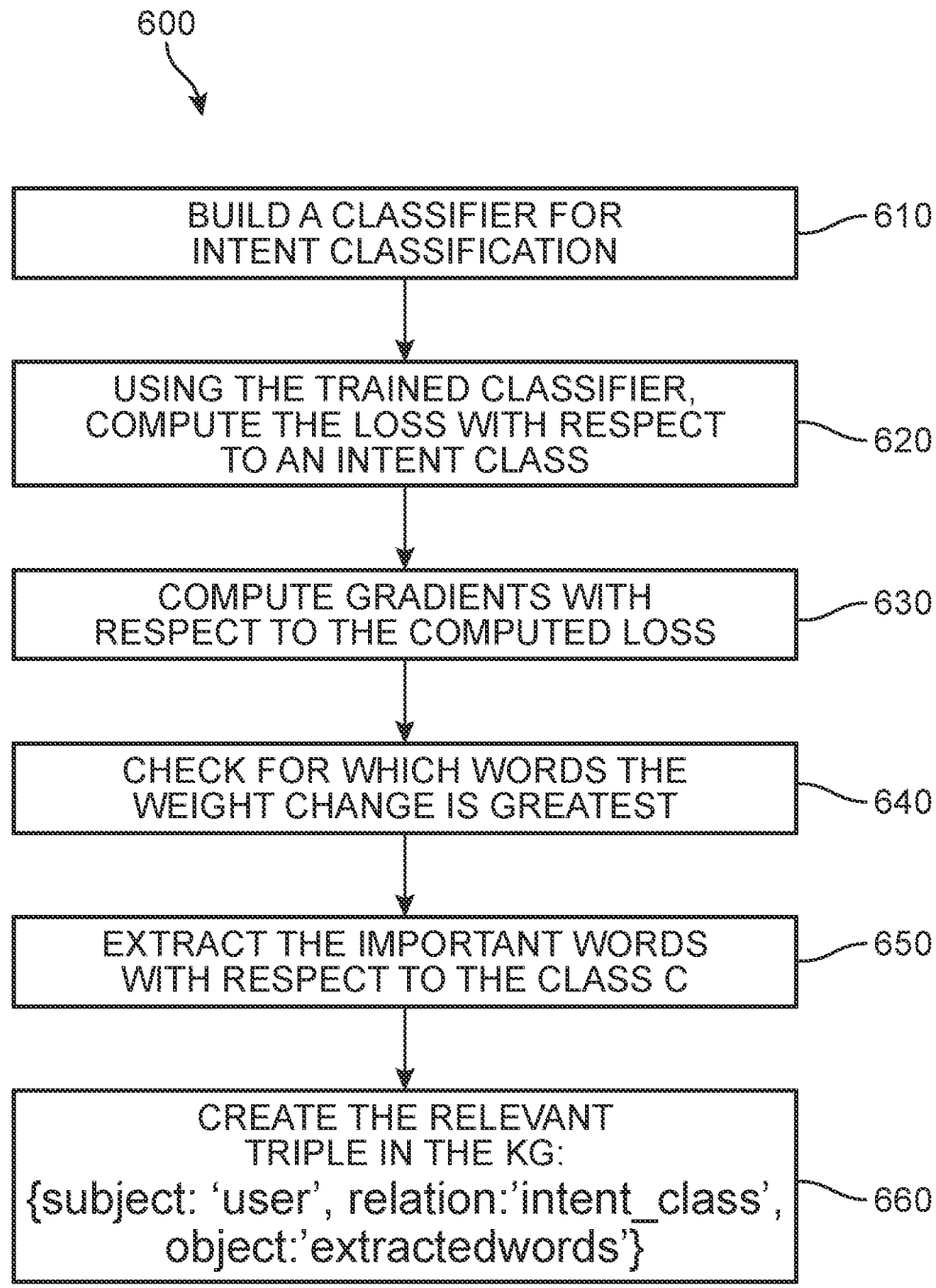
FIG. 6 is a flow chart presenting an example of creating relation triples using intent classification, according to an embodiment.

Referring to FIG. 6, a method 600 of creating the relevant relation triple for a KG is presented. In a first step 610, the classifier for intent classification is built and trained. Additional details regarding the classifier will be provided with reference to FIG. 7 below. In a second step 620, using the trained classifier, the loss with respect to an intent class is computed. The gradients with respect to the computed loss are computed in a third step 630. In a fourth step 640, the words associated with the greatest changes in weight are identified. In general, if a word has a large weight change, it may be understood to have greater importance. The relevant or important words or entities with respect to the intent class are extracted in a fifth step 650, and the appropriate triple is created in the KG in a sixth step 660. In some cases, the triple extraction algorithm in FIG. 8 will be used. As a general matter, relation triples are identified after extracting entities that are related to the intent(s) that were identified. For example, the triple format may comprise an expression such as {subject: 'user', relation: 'intent_class', object: 'extracted words'}. In some embodiments, these relation triples can then be subject to the first method above that classifies the identified relation triples. In addition, a heuristic-based algorithm (e.g., see FIG. 5) can then be used to insert the information into (or append) the knowledge graph. This method can also be referred to as intent classification, and serves the purpose of identifying entities with respect to the specific intent of that particular conversation. This helps to identify the section on the knowledge graph that is to be traversed for responding to the conversation.

Figure 7:
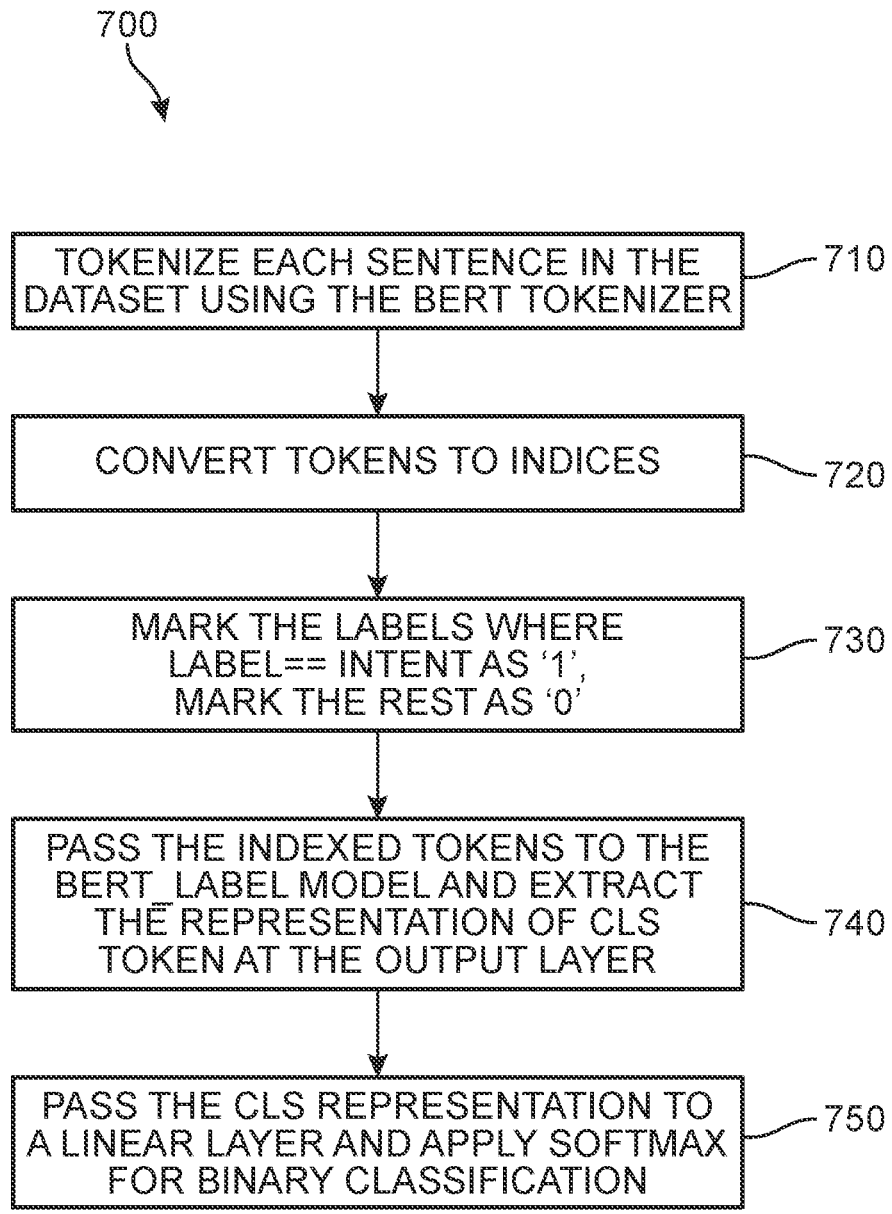
FIG. 7 is a flow chart presenting an example of classifying intents of sentences, according to an embodiment.

Referring next to FIG. 7, a description of one embodiment of an intent classifier process is shown. In different embodiments, the process may be implemented using a BERT-based classifier. In a first step 710, each sentence in the selected dataset is tokenized using the BERT tokenizer (i.e., breaking down of the sentence into tokens). The tokens are then converted to indices in a second step 720 (e.g., converting or encoding each token into their corresponding IDs in the model). In a third step 730, the indices where label==intent are marked or tagged as '1'; otherwise the label is marked with a '0'. This can, for example, allow the encoder to distinguish between the indices. The indexed tokens are then passed to the BERT_label model and the representation of the CLS token is extracted at the output layer in a fourth step 740. Finally, the CLS representation is passed to a linear layer and softmax applied for binary classification in a fifth step 750.

Figure 8:
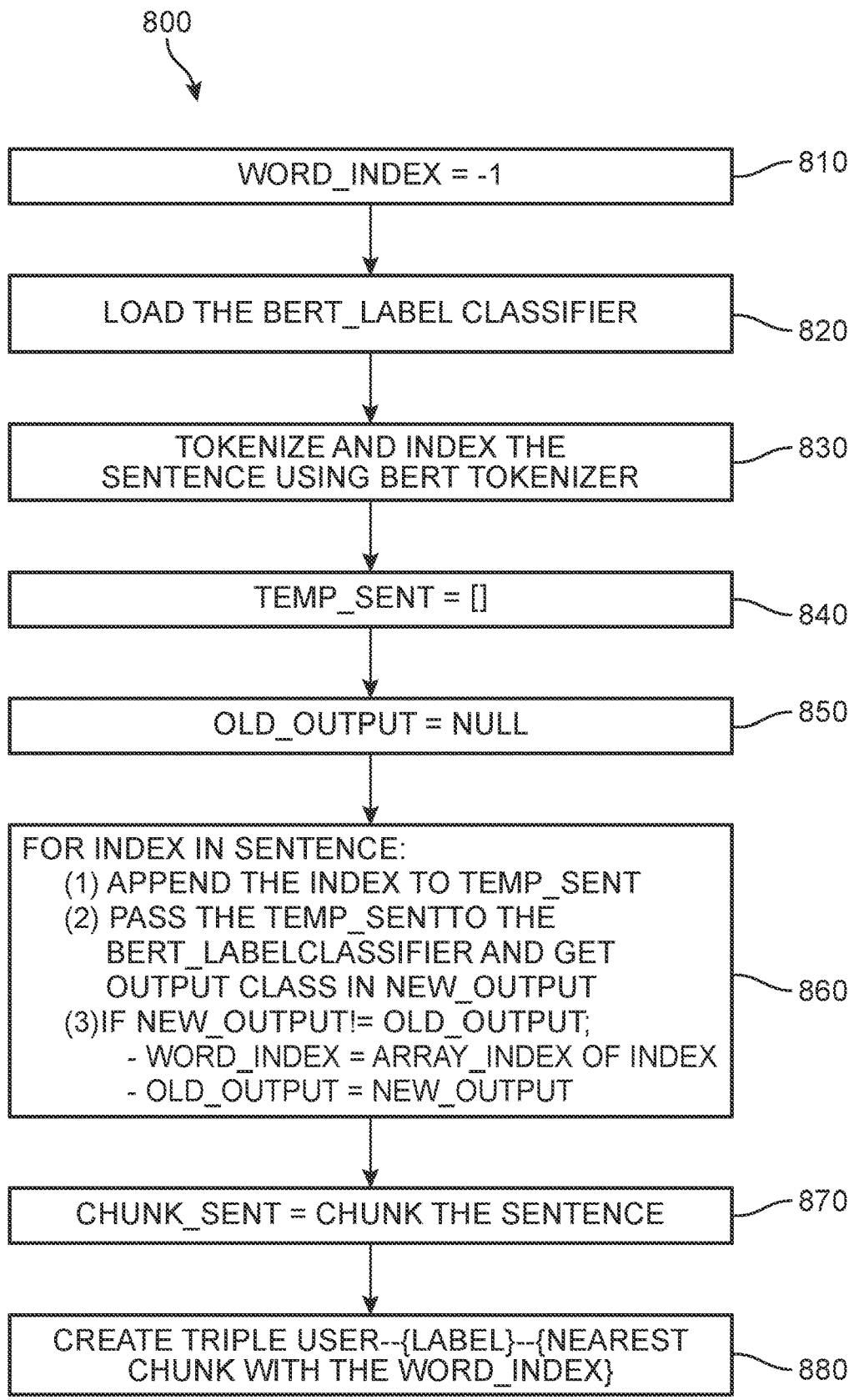
FIG. 8 is a flow chart presenting an example of an intent classification algorithm, according to an embodiment.

In order to create the desired triples from the dataset, the process can apply an algorithm for occlusion-based triple extraction 800, an embodiment of which is shown in FIG. 8. This process will be performed with respect to each label. In a first step 810, the word_index is set to −1. In a second step, the BERT_Label classifier is loaded. In a third step 830, the sentence is tokenized and indexed using the BERT tokenizer. The temp_sent is set to [ ] in a fourth step 840, and the old_output is set to Null in a fifth step 850. For the index in the sentence, a sequence will be performed, as per sixth step 860. The sequence includes appending the index to temp_sent, and passing the temp_sent to the BERT_label classifier to obtain the output class in new_output. If new_output!=old_output, then the word_index will be set to array_index of index, and old_output set to new_output. In a seventh step 870, the Chunk_sent is set to Chunk the sentence, and in eighth step 880, the triple is created. For example, the triple can comprise a format USER—{label}—{nearest chunk with the word_index}.

Figure 9:
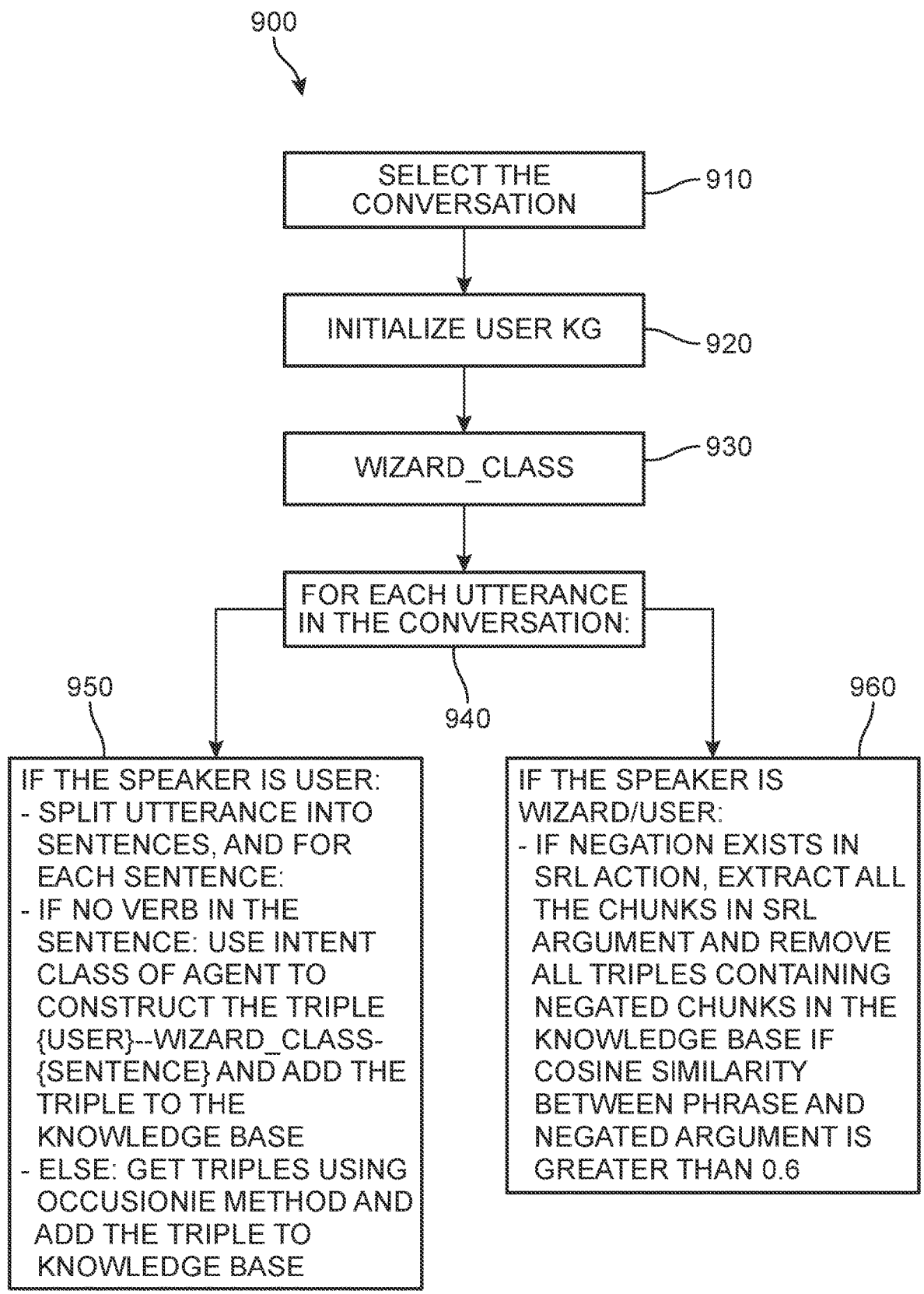
FIG. 9 is a flow diagram presenting an example of a process for constructing a knowledge graph, according to an embodiment.

An embodiment of a process 900 of constructing the knowledge graph is now presented with respect to FIG. 9. In a first step 910, the conversation or other source of information is selected, and in a second step 920 the user KG is initialized. The wizard_class is run in a third step 930. For each utterance in the conversation (fourth step 940), two different pathways may be traversed, depending on who the speaker of the utterance is. If the speaker is the user (fifth step 950), the utterance is split into one or more sentences. For each sentence, if there is no verb in the sentence, the triple is constructed using the intent class of the agent (e.g., {USER}—wizard_class—{sentence}), and the triple is added to the knowledge graph. If the sentence does include a verb, the triple(s) will be obtained using the occlusion-based method described above with respect to FIG. 8 and then added to the knowledge graph. If, on the other hand, the speaker is the wizard/user (sixth step 960), semantic role labeling (SRL) will be used to determine if negation is present. If negation is detected, all chunks in the SRL argument will be extracted, and all triples in the negated chunks will be removed from the knowledge graph if cosine similarity between the phrase and the negated argument is greater than 0.6.

Experiments for intent classification and KG construction were conducted to test embodiments of the proposed methods using the two datasets. The classifier was trained for intent classification using the steps discussed above. Detailed evaluation results of the classifier as applied to the two datasets in terms of recall (R), precision (P), and F1-score (F) are shown in Tables 5 and 6 below.

TABLE 5

MS Frames Dataset

| Class | Precision | Recall | F1-Score |
| --- | --- | --- | --- |
| Source City | 0.93 | 0.88 | 0.90 |
| Destination City | 0.92 | 0.76 | 0.84 |
| Trip Start Date | 0.83 | 0.91 | 0.87 |
| Trip End Date | 0.94 | 0.59 | 0.73 |
| Number of People | 0.81 | 0.77 | 0.79 |
| Budget | 0.91 | 0.97 | 0.94 |

TABLE 6

MS e2e Dataset

| Class | Precision | Recall | F1-Score |
| --- | --- | --- | --- |
| Pickup_Location | 0.84 | 0.82 | 0.83 |
| Dropoff_Location | 0.86 | 0.81 | 0.83 |
| Number_of_People | 0.91 | 0.98 | 0.94 |
| Cost | 0.93 | 0.91 | 0.92 |
| Car_Type | 0.90 | 0.88 | 0.89 |
| Pickup_Time | 0.89 | 0.93 | 0.91 |

Once the classifier has been trained and acceptable classification scores have been obtained, the KG may be constructed. In one example, the KG is constructed using the heuristic presented in FIG. 5 or portions thereof. The results obtained are measured in terms of 'Correctness' and 'Completeness', where correctness refers to the percentage of correctly identified triples in the conversation and completeness refers to the percentage of triples extracted out of the total actual triples in the conversations. The results thus obtained for the Microsoft® e2e dataset for each of the three processes are shown in Table 7 below.

TABLE 7

| Dataset | Correctness | Coverage |
| --- | --- | --- |
| Microsoft e2e (Using OpenIE Triples) | 0.71 | 0.40 |
| Microsoft e2e (Using Occlusion IE method) | 0.80 | 0.61 |
| Microsoft e2e (Using Occlusion IE method + Wizard Intent) | 0.82 | 0.72 |

It may be appreciated that a significant advantage of utilizing a knowledge graph as the primary or sole source of information for automated chatbots is their flexible structure. In other words, the ontology can be extended and revised as new data arrives. As more conversations and associated data are collected about similar topics, intents, goals, and/or tasks, the knowledge graph remains pliant and easily accommodates updates and data growth, supporting a continuously running data pipeline that keeps adding new knowledge to the graph, and refining the graph as new information (e.g., conversational data) arrives.

An embodiment of a computer implemented method of relation classification for generating knowledge graphs is presented. The method includes a first step of extracting a first relation triple from conversational data and a second step of marking each entity in the first relation triple with unused tokens to produce an enriched sentence. A third step includes tokenizing the enriched sentence with one or more tokens, and a fourth step includes assigning token indices to each of the one or more tokens to produce an indexed sentence. The method also includes a fifth step of extracting a representation of a classification token (CLS) from the indexed sentence, and a sixth step of classifying the enriched sentence into at least a first relation class. The method further includes a seventh step of populating a knowledge graph with the first relation triple based on the classification of the enriched sentence.

In other embodiments, the method may include additional steps or aspects. In some embodiments, the method also includes extracting any entities, relations, and entity-relation triples from the conversational data, including the first relation triple. In one embodiment, a BERT classifier is used to classify the first relation triple in the enriched sentence. In another embodiment, the method also includes training the BERT classifier on seed data comprising a plurality of relation triples and their corresponding utterances and a test set comprising annotated utterance samples. In some embodiments, the method also includes running the trained BERT classifier on un-annotated data, and obtaining the prediction probabilities using the final softmax layer of the BERT classifier.

In another example, the method further includes calculating entropy values of each of the prediction probabilities, and adding samples from the test set associated with the largest entropy value to the seed data. In some other examples, the method can include detecting negated arguments in the conversational data using semantic role labelling (SRL), identifying a second relation triple in the knowledge graph that include entities matching any of the detected negated arguments or portions thereof, and removing the second relation triple from the knowledge graph. In some embodiments, the method further comprises determining that an enriched sentence for a second relation triple in the conversational data is also classified in the first relation class, and replacing the first relation triple with a second relation triple.

Other methods can also be contemplated within the scope of this disclosure. For example, a computer implemented method of constructing relation triples for populating knowledge graphs from a conversational dataset is also disclosed. The method includes a first step of tokenizing a first sentence in the conversational dataset to produce a first tokenized sentence, and a second step of assigning token indices to each of the one or more tokens to produce an indexed sentence. In addition, a third step includes classifying the first indexed sentence into an intent class and a fourth step includes computing a stochastic gradient of loss for the intent class. A fifth step includes determining which words are associated with the largest weight change based on the stochastic gradient of loss. Furthermore, a sixth step includes extracting one or more words associated with the largest weight change, and a seventh step includes creating a first relation triple based on the extracted one or more words. In some embodiments, the method can further include a step of populating a knowledge graph with the first relation triple.

With the benefits offered by a knowledge graph, the proposed systems and methods can more readily apply natural language understanding, shifting from conventional machine learning slot-based models that were capable of only detecting nouns and verbs to machine learning that enables semantic parsing. As a result, a chatbots will possess a wider range of contextual understanding and more precisely understand the utterance of a user. In addition, domain modeling in knowledge graphs give rise to an inherently simpler and tractable model. Furthermore, because knowledge graphs are dynamic, they enable decision trees at nodes to be scaled and managed more easily. Such dynamicity also supports increased inference by the chatbot, such that automated conversations can re-iterate and question a user to reach the most accurate conclusion. This approach naturally broadens the capacity of the chatbot to dialogue with a customer beyond static or pre-scripted responses, and allow chatbots to both ask and answer complex queries that involve multi-node relationships that require navigation across multiple decision trees and entities.

In different embodiments, the disclosed system and method may be part of a natural language understanding system or a spoken language understanding system. Furthermore, in some embodiments, the natural language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition).

Thus, as described herein, a chatbot conversation can be automated to provide a dynamic interaction experience with a customer. With the benefits offered by a knowledge graph, the proposed systems and methods can more readily apply natural language understanding, shifting from conventional machine learning slot-based models that were capable of only detecting nouns and verbs to machine learning that enables semantic parsing. As a result, a chatbots will possess a wider range of contextual understanding and more precisely understand the utterance of a user. In addition, domain modeling in knowledge graphs give rise to an inherently simpler and tractable model. Furthermore, because knowledge graphs are dynamic, they enable decision trees at nodes to be scaled and managed more easily. Such dynamicity also supports increased inference by the chatbot, such that automated conversations can re-iterate and question a user to reach the most accurate conclusion. This approach naturally broadens the capacity of the chatbot to dialogue with a customer beyond static or pre-scripted responses, and allow chatbots to both ask and answer complex queries that involve multi-node relationships that require navigation across multiple decision trees and entities. The proposed embodiments can thereby offer a more personalized customer experience, resulting in both increased customer loyalty and higher customer satisfaction and retention. The system also improves customer engagement and customer acquisition rates, and reduces costs.

Figure 10:
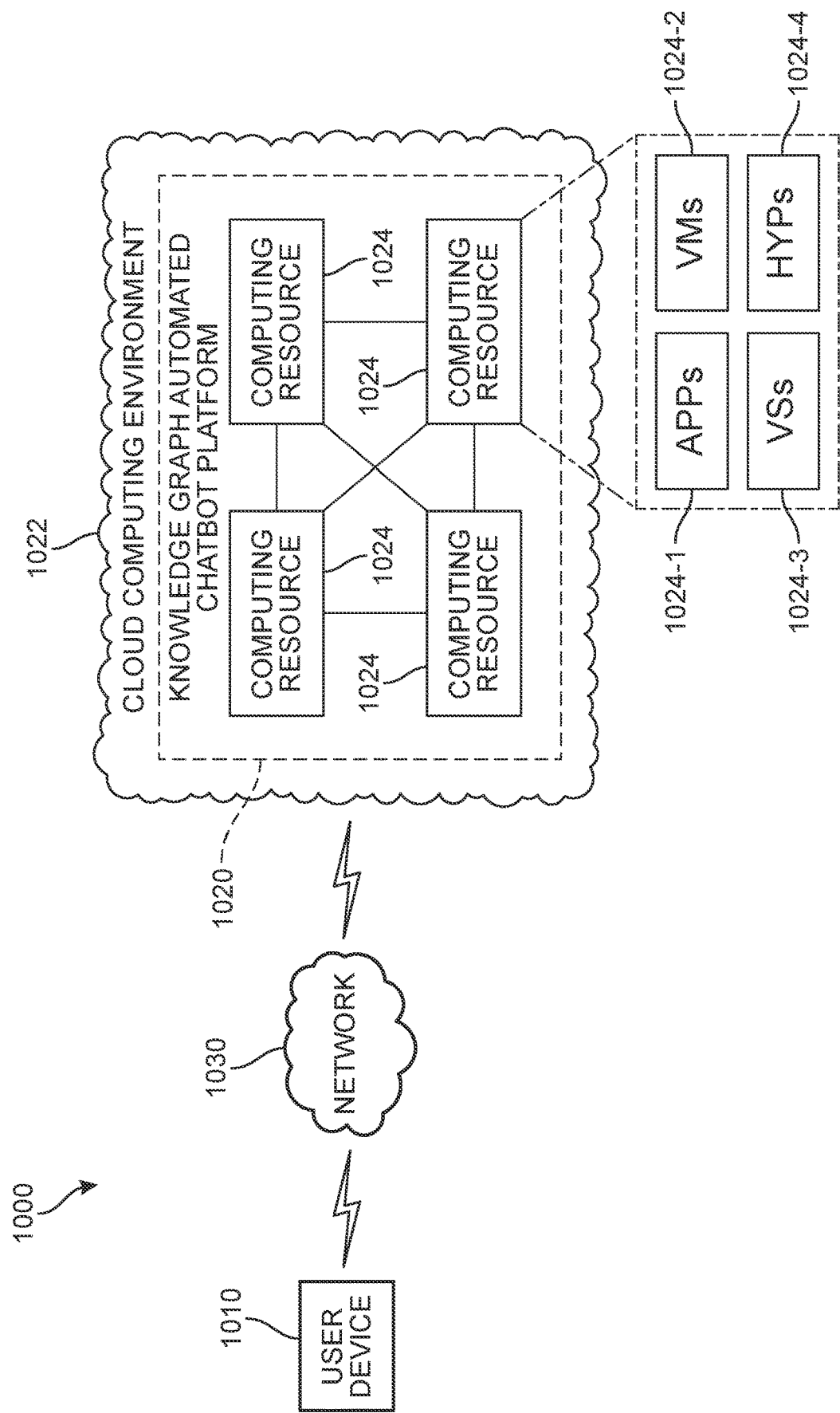
FIG. 10 is a diagram of an example environment in which systems and/or methods, described herein, may be implemented.

FIG. 10 is a diagram of an example environment 1000 in which systems and/or methods, described herein, may be implemented. As shown in FIG. 10, environment 1000 may include a user device 1010, a knowledge graph automated chatbot platform 1020, and a network 1030. Devices of environment 1000 may interconnect via wired connections, wireless connections, or a combination of wired and wireless connections.

User device 1010 includes one or more devices capable of receiving, generating, storing, processing, and/or providing information, such as information described herein. For example, user device 1010 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 1010 may receive information from and/or transmit information to knowledge graph automated chatbot platform 1020.

Knowledge graph automated chatbot platform 1020 includes one or more devices that predicts links in knowledge graphs using ontological knowledge. In some implementations, knowledge graph automated chatbot platform 1020 may be designed to be modular such that certain software components may be swapped in or out depending on a particular need. As such, knowledge graph automated chatbot platform 1020 may be easily and/or quickly reconfigured for different uses. In some implementations, knowledge graph automated chatbot platform 1020 may receive information from and/or transmit information to one or more user devices 1010.

In some implementations, as shown, knowledge graph automated chatbot platform 1020 may be hosted in a cloud computing environment 1022. Notably, while implementations described herein describe knowledge graph automated chatbot platform 1020 as being hosted in cloud computing environment 1022, in some implementations, knowledge graph automated chatbot platform 1020 may not be cloud-based (i.e., may be implemented outside of a cloud computing environment) or may be partially cloud-based.

Cloud computing environment 1022 includes an environment that hosts knowledge graph automated chatbot platform 1020. Cloud computing environment 1022 may provide computation, software, data access, storage, etc. services that do not require end-user knowledge of a physical location and configuration of system(s) and/or device(s) that hosts knowledge graph automated chatbot platform 1020. As shown, cloud computing environment 1022 may include a group of computing resources 1024 (referred to collectively as "computing resources 1024" and individually as "computing resource 1024").

Computing resource 1024 includes one or more personal computers, workstation computers, server devices, or other types of computation and/or communication devices. In some implementations, computing resource 1024 may host knowledge graph automated chatbot platform 1020. The cloud resources may include compute instances executing in computing resource 1024, storage devices provided in computing resource 1024, data transfer devices provided by computing resource 1024, etc. In some implementations, computing resource 1024 may communicate with other computing resources 1024 via wired connections, wireless connections, or a combination of wired and wireless connections.

As further shown in FIG. 10, computing resource 1024 includes a group of cloud resources, such as one or more applications ("APPs") 1024-1, one or more virtual machines ("VMs") 1024-2, virtualized storage ("VSs") 1024-3, one or more hypervisors ("HYPs") 1024-4, and/or the like.

Application 1024-1 includes one or more software applications that may be provided to or accessed by user device 1010. Application 1024-1 may eliminate a need to install and execute the software applications on user device 1010. For example, application 1024-1 may include software associated with knowledge graph automated chatbot platform 1020 and/or any other software capable of being provided via cloud computing environment 1022. In some implementations, one application 1024-1 may send/receive information to/from one or more other applications 1024-1, via virtual machine 1024-2.

Virtual machine 1024-2 includes a software implementation of a machine (e.g., a computer) that executes programs like a physical machine. Virtual machine 1024-2 may be either a system virtual machine or a process virtual machine, depending upon use and degree of correspondence to any real machine by virtual machine 1024-2. A system virtual machine may provide a complete system platform that supports execution of a complete operating system ("OS"). A process virtual machine may execute a single program, and may support a single process. In some implementations, virtual machine 1024-2 may execute on behalf of a user (e.g., a user of user device 1010 or an operator of knowledge graph automated chatbot platform 1020), and may manage infrastructure of cloud computing environment 1022, such as data management, synchronization, or long-duration data transfers.

Virtualized storage 1024-3 includes one or more storage systems and/or one or more devices that use virtualization techniques within the storage systems or devices of computing resource 1024. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1024-4 may provide hardware virtualization techniques that allow multiple operating systems (e.g., "guest operating systems") to execute concurrently on a host computer, such as computing resource 1024. Hypervisor 1024-4 may present a virtual operating platform to the guest operating systems, and may manage the execution of the guest operating systems. Multiple instances of a variety of operating systems may share virtualized hardware resources.

Network 1030 includes one or more wired and/or wireless networks. For example, network 1030 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
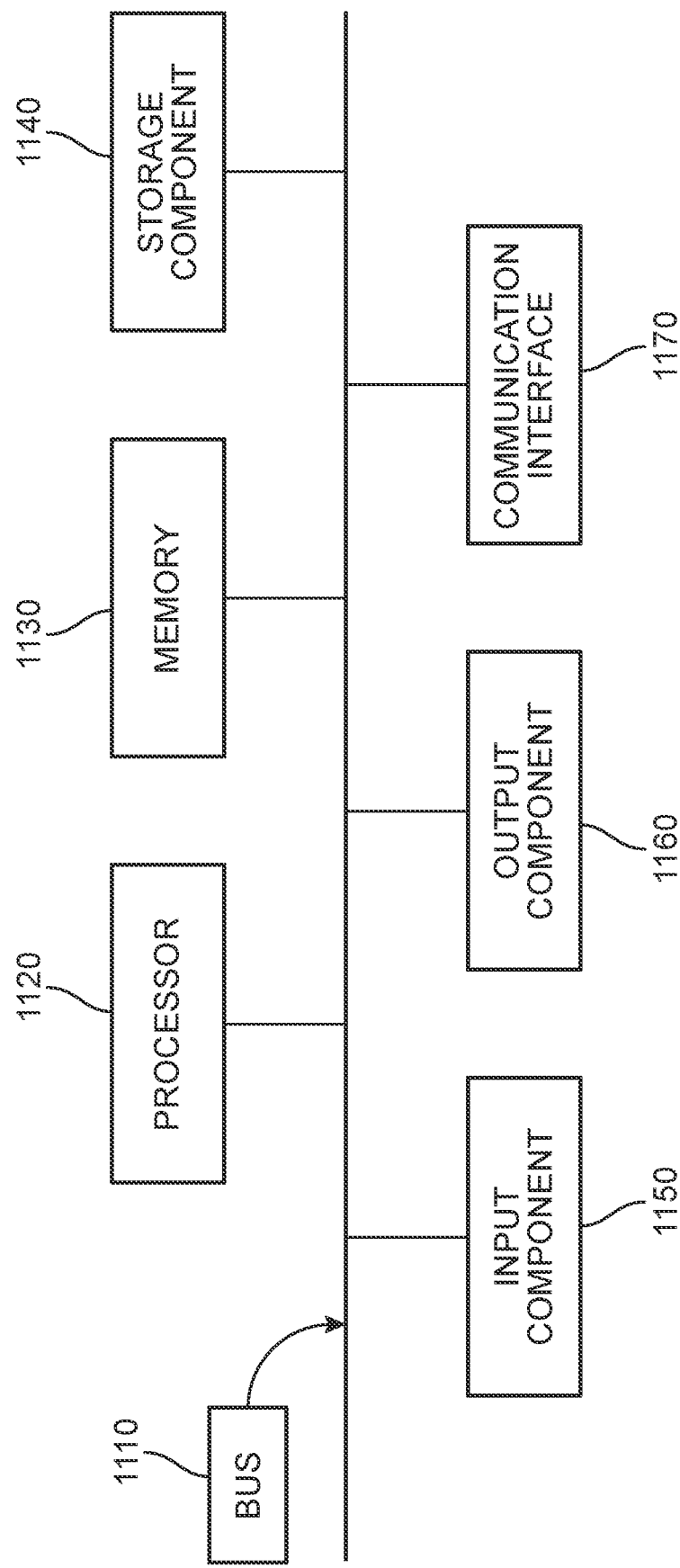
FIG. 11 is a diagram of example components of one or more devices of FIG. 10.

FIG. 11 is a diagram of example components of a device 1100. Device 1100 may correspond to user device 1010, prediction platform 1020, and/or computing resource 1024. In some implementations, user device 1010, prediction platform 1020, and/or computing resource 1024 may include one or more devices 1100 and/or one or more components of device 1100. As shown in FIG. 11, device 1100 may include a bus 1110, a processor 1120, a memory 1130, a storage component 1140, an input component 1150, an output component 1160, and a communication interface 1170.

Bus 1110 includes a component that permits communication among the components of device 1100. Processor 1120 is implemented in hardware, firmware, or a combination of hardware and software. Processor 1120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1120 includes one or more processors capable of being programmed to perform a function. Memory 1130 includes a random access memory (RAM), a read only memory (ROM), and/or another type of dynamic or static storage device (e.g., a flash memory, a magnetic memory, and/or an optical memory) that stores information and/or instructions for use by processor 1120.

Storage component 1140 stores information and/or software related to the operation and use of device 1100. For example, storage component 1140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1150 includes a component that permits device 1100 to receive information, such as via user input (e.g., a touch screen display, a keyboard, a keypad, a mouse, a button, a switch, and/or a microphone). Additionally, or alternatively, input component 1150 may include a sensor for sensing information (e.g., a global positioning system (GPS) component, an accelerometer, a gyroscope, and/or an actuator). Output component 1160 includes a component that provides output information from device 1100 (e.g., a display, a speaker, and/or one or more light-emitting diodes (LEDs)).

Communication interface 1170 includes a transceiver-like component (e.g., a transceiver and/or a separate receiver and transmitter) that enables device 1100 to communicate with other devices, such as via a wired connection, a wireless connection, or a combination of wired and wireless connections. Communication interface 1170 may permit device 1100 to receive information from another device and/or provide information to another device. For example, communication interface 1170 may include an Ethernet interface, an optical interface, a coaxial interface, an infrared interface, a radio frequency (RF) interface, a universal serial bus (USB) interface, a Wi-Fi interface, a cellular network interface, and/or the like.

Device 1100 may perform one or more processes described herein. Device 1100 may perform these processes based on processor 1120 executing software instructions stored by a non-transitory computer-readable medium, such as memory 1130 and/or storage component 1140. A computer-readable medium is defined herein as a non-transitory memory device. A memory device includes memory space within a single physical storage device or memory space spread across multiple physical storage devices.

Software instructions may be read into memory 1130 and/or storage component 1140 from another computer-readable medium or from another device via communication interface 1170. When executed, software instructions stored in memory 1130 and/or storage component 1140 may cause processor 1120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 11 are provided as an example. In practice, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

Throughout this application, a virtual assistant may also be referred to as a virtual assistant system, a digital assistant, a digital assistant system, a digital personal assistant, an automated chatbot ("chatbot") and/or an automated agent. As a general matter, such terms should be understood to encompass a processing environment that is adapted to utilize spoken cues from utterances spoken in session to influence a render state for an interface serving as an activity session assistant. Thus, some or all of the processing environment may be referred to as, included in, and/or include the virtual assistant. Furthermore, a virtual assistant and associated systems for communicating with a virtual assistant may include one or more user devices, such as a computer, a server, a database, and a network. For example, a virtual assistant running on a server could communicate with a user over a network.

In different embodiments, the VA may be accessed via a user interface for the VA system. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted. Also, various modifications and changes may be made within the scope of the attached claims.

We claim:

1. A computer implemented method of relation classification for generating knowledge graphs, the method comprising:
extracting a first relation triple from conversational data including one or more entities, comprising:
for a first utterance in the conversational data,
in response to a determination that a speaker is a user, splitting the first utterance into one or more sentences,
for a first sentence of the one or more sentences, in response to a determination that a verb is absent in the first sentence, extracting the first relation triple using an intent classifier based triple extraction, and
for the first sentence of the one or more sentences, in response to a determination that a verb is present in the first sentence, extracting the first relation triple using a triple extraction which is different than the intent classifier based triple extraction;
marking each entity of the one or more entities in the first relation triple with Bidirectional Encoder Representations from Transformers (BERT) unused tokens to produce a first enriched sentence;
tokenizing, using a BERT tokenizer, the first enriched sentence with one or more tokens;
assigning token indices to each of the one or more tokens to produce an indexed sentence;
extracting a representation of a classification token (CLS) from the indexed sentence;
classifying the first enriched sentence into at least a first relation class based on the representation of the classification token;
populating a knowledge graph with the first relation triple based on the first relation class;
determining whether a second enriched sentence for a second relation triple in the conversational data is classified in the first relation class; and
replacing the first relation triple with the second relation triple in the populated knowledge graph in response to determining that the second enriched sentence is classified to be in the first relation class.

2. The method of claim 1, further comprising extracting any entities, relations, and entity-relation triples from the conversational data, including the first relation triple and the second relation triple.

3. The method of claim 1, wherein a BERT classifier is used to classify the first enriched sentence and the second enriched sentence.

4. The method of claim 3, further comprising training the BERT classifier on seed data comprising a plurality of relation triples and their corresponding utterances and a test set comprising annotated utterance samples.

5. The method of claim 4, further comprising:
running the trained BERT classifier on un-annotated data; and
obtaining prediction probabilities using final SoftMax layer of the BERT classifier.

6. The method of claim 5, further comprising:
calculating entropy values of each of the prediction probabilities; and
adding samples from the test set associated with a largest entropy value to the seed data.

7. The method of claim 1, further comprising:
detecting negated arguments in the conversational data using semantic role labelling (SRL);
identifying the second relation triple in the knowledge graph that includes entities matching any of the detected negated arguments or portions thereof; and
removing the second relation triple from the knowledge graph.

8. A non-transitory computer-readable medium storing instructions executable by one or more computers which, upon such execution, cause the one or more computers to:
  extract a first relation triple from conversational data including one or more entities, comprising:
    for a first utterance in the conversational data,
      in response to a determination that a speaker is a user, splitting the first utterance into one or more sentences,
      for a first sentence of the one or more sentences, in response to a determination that a verb is absent in the first sentence, extracting the first relation triple using an intent classifier based triple extraction, and
      for the first sentence of the one or more sentences, in response to a determination that a verb is present in the first sentence, extracting the first relation triple using a triple extraction which is different than the intent classifier based triple extraction;
  mark each entity of the one or more entities in the first relation triple with Bidirectional Encoder Representations from Transformers (BERT) unused tokens to produce a first enriched sentence;
  tokenize, using a BERT tokenizer, the first enriched sentence with one or more tokens;
  assign token indices to each of the one or more tokens to produce an indexed sentence;
  extract a representation of a classification token (CLS) from the indexed sentence;
  classify the first enriched sentence into at least a first relation class based on the representation of the classification token; and
  populate a knowledge graph with the first relation triple based on the first relation class;
  determine whether a second enriched sentence for a second relation triple in the conversational data is classified in the first relation class; and
  replace the first relation triple with the second relation triple in the populated knowledge graph in response to determining that the second enriched sentence is classified to be in the first relation class.

9. The non-transitory computer-readable medium of claim 8, wherein a BERT classifier is used to classify the first enriched sentence and the second enriched sentence.

10. The non-transitory computer-readable medium of claim 9, wherein the instructions further cause the one or more computers to train the BERT classifier on seed data comprising a plurality of relation triples and their corresponding utterances and a test set comprising annotated utterance samples.

11. The non-transitory computer-readable medium of claim 10, wherein the instructions further cause the one or more computers to:
  run the trained BERT classifier on un-annotated data; and
  obtain prediction probabilities using final SoftMax layer of the BERT classifier.

12. The non-transitory computer-readable medium of claim 8, wherein the instructions further cause the one or more computers to:
  calculate entropy values of each of the prediction probabilities; and
  add samples from a test set associated with a largest entropy value to seed data.

13. A system for generating responses to queries, comprising one or more computers and one or more storage devices storing instructions that are operable, when executed by the one or more computers, to cause the one or more computers to:
  extract a first relation triple from conversational data including one or more entities, comprising:
    for a first utterance in the conversational data,
      in response to a determination that a speaker is a user, splitting the first utterance into one or more sentences,
      for a first sentence of the one or more sentences, in response to a determination that a verb is absent in the first sentence, extracting the first relation triple using an intent classifier based triple extraction, and
      for the first sentence of the one or more sentences, in response to a determination that a verb is present in the first sentence, extracting the first relation triple using a triple extraction which is different than the intent classifier based triple extraction;
  mark each entity of the one or more entities in the first relation triple with Bidirectional Encoder Representations from Transformers (BERT) unused tokens to produce a first enriched sentence;
  tokenize, using a BERT tokenizer, the first enriched sentence with one or more tokens;
  assign token indices to each of the one or more tokens to produce an indexed sentence;
  extract a representation of a classification token (CLS) from the indexed sentence;
  classify the first enriched sentence into at least a first relation class based on the representation of the classification token; and
  populate a knowledge graph with the first relation triple based on the first relation class;
  determine whether a second enriched sentence for a second relation triple in the conversational data is classified in the first relation class; and
  replace the first relation triple with the second relation triple in the populated knowledge graph in response to determining that the second enriched sentence is classified to be in the first relation class.

14. The system of claim 13, wherein a BERT classifier is used to classify the first enriched sentence and the second enriched sentence.

15. The system of claim 14, wherein the instructions further cause the one or more computers to train the BERT classifier on seed data comprising a plurality of relation triples and their corresponding utterances and a test set comprising annotated utterance samples.

16. The system of claim 15, wherein the instructions further cause the one or more computers to:
  run the trained BERT classifier on un-annotated data; and
  obtain prediction probabilities using final SoftMax layer of the BERT classifier.

17. The system of claim 16, wherein the instructions further cause the one or more computers to:
  calculate entropy values of each of the prediction probabilities; and
  add samples from the test set associated with a largest entropy value to the seed data.

* * * * *